United States Patent
Chao-Suren et al.

(10) Patent No.: US 8,279,861 B2
(45) Date of Patent: Oct. 2, 2012

(54) REAL-TIME VOIP COMMUNICATIONS USING N-WAY SELECTIVE LANGUAGE PROCESSING

(75) Inventors: Chi-Chuen Chao-Suren, Essex Junction, VT (US); Ezran D. B. Hall, Essex Junction, VT (US); Pascal A. Nsame, Essex Junction, VT (US); Aydin Suren, Essex Junction, VT (US); Sebastian T. Ventrone, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 239 days.

(21) Appl. No.: 12/633,149

(22) Filed: Dec. 8, 2009

(65) Prior Publication Data

US 2011/0134910 A1 Jun. 9, 2011

(51) Int. Cl.
*H04L 12/66* (2006.01)
*H04M 1/64* (2006.01)
*G06F 17/28* (2006.01)
*G06F 17/20* (2006.01)

(52) U.S. Cl. ............. 370/356; 379/88.05; 704/2; 704/8; 704/277

(58) Field of Classification Search .................. None
See application file for complete search history.

(56) References Cited

U.S. PATENT DOCUMENTS

| | | | |
|---|---|---|---|
| 5,719,786 A * | 2/1998 | Nelson et al. | 709/219 |
| 5,810,599 A * | 9/1998 | Bishop | 434/157 |
| 6,434,526 B1 | 8/2002 | Cilurzo et al. | |
| 6,901,367 B1 * | 5/2005 | Berstis et al. | 704/277 |
| 7,058,046 B2 | 6/2006 | Celi, Jr. et al. | |
| 7,170,987 B2 | 1/2007 | Fang | |
| 7,406,414 B2 | 7/2008 | Creamer et al. | |
| 2001/0046282 A1 * | 11/2001 | Bailey, III | 379/93.25 |
| 2002/0161579 A1 * | 10/2002 | Saindon et al. | 704/235 |
| 2004/0122677 A1 | 6/2004 | Lee et al. | |
| 2005/0144247 A1 | 6/2005 | Christensen et al. | |
| 2005/0261890 A1 * | 11/2005 | Robinson | 704/9 |
| 2006/0146993 A1 * | 7/2006 | Croak et al. | 379/88.05 |
| 2007/0286098 A1 | 12/2007 | Combs et al. | |
| 2008/0056245 A1 | 3/2008 | Boutboul | |
| 2008/0059147 A1 | 3/2008 | Afify et al. | |
| 2008/0059200 A1 | 3/2008 | Puli | |
| 2008/0177528 A1 | 7/2008 | Drewes | |
| 2009/0144048 A1 * | 6/2009 | Dvorin et al. | 704/3 |
| 2009/0177462 A1 * | 7/2009 | Alfven | 704/3 |

* cited by examiner

*Primary Examiner* — Melanie Jagannathan
(74) *Attorney, Agent, or Firm* — Gibb & Riley, LLC; Michael J. LeStrange, Esq.

(57) ABSTRACT

A computer-implemented method and system of enabling concurrent real-time multi-language communication between multiple participants using a selective broadcast protocol, the method including receiving at a first server a real-time communication from a first participant, the real-time communication being addressed to a second participant constructed in a first spoken language. A preferred spoken language of receipt of real-time communication is identified by the second participant. A determination is made whether the preferred spoken language of receipt is different than that of the first spoken language of the real-time communication. The real-time communication from the first spoken language is translated and delivered to the preferred spoken language of receipt of the second participant to create a translated real-time communication whenever the preferred spoken language is different than the first spoken language and forwarded without translation when the preferred spoken language of the second participant is the same as the preferred spoken language of the first participant.

10 Claims, 14 Drawing Sheets

REAL-TIME VOIP COMMUNICATIONS USING N-WAY SELECTIVE LANGUAGE PROCESSING

BACKGROUND OF THE INVENTION

1. Field of the Invention

An embodiment of the invention relates to electronic translation devices and methods for translating phrases from one language to another using an n-Way selective voice protocol.

2. Description of the Related Art

An Internet Protocol (IP) Private Branch Exchange (PBX) is a private branch exchange, or telephone switching system, that routes calls over an IP network for internal participants and provides access to outside lines. Typically, an IP PBX also switches calls between VoIP participants and callers on traditional telephone systems. These products are usually software packages running on a server or dedicated appliances. IP PBXs eliminate the need for a separate voice network, instead converging voice and data traffic on the same network. Existing products offer a variety of call-management features, such as voice-menu systems, call conferencing, click-to-call, call logging and tracking, voice mail and call forwarding. With their IP PBXs, companies can chose to use "soft-phones," i.e., software-only implementations of IP phones that run on participant desktops, or traditional desktop phone sets designed to work over IP networks.

According to Robin Gareiss from Nemertes Research, organizations save 15% to 40% on their WAN costs when they move to VoIP, and the average saved is 23%. Three primary areas of saving are:

1. Migration to Multiprotocol Label Switching (MPLS), typically from frame relay, asynchronous transfer mode or leased-line networks. VoIP is the driver to switch to MPLS, but the overall costs for the same-speed circuits are less. See http://www.networkworld.com/community/node/18007.

2. Integrated access, whereby companies combine voice and data over the same access lines, thus, eliminating underused pipes.

3. Integrated core circuits. Organizations combine their voice and data networks, resulting in an average use of 60% and peak use reaching 75% to 85% on extremely well-managed networks. They eliminate the need for idle, higher-speed circuits in the core.

MPLS has its roots in Ipsilon's™ IP Switching, Cisco's™ Tag Switching, IBM's™ ARIS™ technology and a few other proposals to bring the sort of traffic engineering found in connection-oriented Asynchronous Transfer Mode and frame relay networks to connectionless IP networks. The idea is to steer IP traffic onto a variety of routes instead of the single one discovered by an interior gateway protocol such as Border Gateway Protocol, to avoid congestion or failures, or to enable a particular class of service or guaranteed service level. MPLS switches and routers affix labels to packets based on their destination, type-of-service parameters, Virtual Private Network membership or other criteria. As a packet traverses a network, other switches and routers build tables associating packets and routes with labels. The MPLS switches and routers—dubbed label switch routers—assign each packet a label that corresponds to a particular path through the network. All packets with the same label use the same path—a so-called Label Switched Path (LSP). Because labels refer to paths and not endpoints, packets destined for the same endpoint can use a variety of LSPs to get there. Existing Internet switching systems (IP PBX) are optimized for routing packet from one endpoint to another. However, an application with VOIP packets has real-time processing requirements in addition to real-time routing requirements. Today, the communications using Voice over IP (VoIP) between different language speaking people can only be conducted with languages that both calling and receiving parties can understand/speak. As the companies integrate global resources into their work forces, the language barrier becomes a more important obstacle. This invention relates to electronic translation devices and methods for translating phrases from one language to another using an n-Way selective voice protocol.

In a development project, ineffective communication between a geographically disperse teams increases project risks and costs. Today, the communications over Voice IP (VoIP) between different language speaking people can only be conducted with languages that both calling and receiving parties can understand/speak or via an interpreter.

This invention extends existing VOIP networks to enable multi-participant simultaneous translation capabilities and services.

SUMMARY OF THE INVENTION

In view of the foregoing and other exemplary problems, drawbacks, and disadvantages of the conventional methods and structures, the exemplary aspects of an embodiment of the invention provide a computer-implemented method of enabling real-time communication using a selective broadcast protocol between multiple participants, the method including receiving at a first server a real-time communication from a first participant, the real-time communication being addressed to a second participant constructed in a first spoken language. A preferred spoken language of receipt of real-time communication is identified by the second participant. A determination is made whether the preferred spoken language of receipt is different than that of the first spoken language of the real-time communication. The real-time communication from the first spoken language is translated to the preferred spoken language of receipt of the second participant to create a translated real-time communication whenever the preferred spoken language is different than the first spoken language. The translated real-time communication is delivered to the second participant.

Another exemplary embodiment of the invention provides a communication system including at least one sending Voice Over Internet protocol (VOIP) server, at least one receiving VOIP server, and at least one VOIP communication network providing communication between the sending VOIP server and the receiving VOIP server. The translating module establishes an active n-way bidirectional automatic voice translation channel between the sending and the receiving VOIP servers across the at least one VOIP communication network. A processing VOIP server at a specific location translates at least one spoken language between participants of different spoken languages on the at least one VOIP communication network. Processing the at least one spoken language is determined to be carried out at the specific location of the processing VOIP server based on respective participant location and profiles.

Another exemplary embodiment of the invention provides a computer-implemented method that includes initiating a multiple-location multi-participant voice translation session, then determining whether voice translation processing is required based on participant. Available translation resources are determined at each of the multiple locations and a maximum number of possible simultaneous translation processes are calculated based on the available translation resources at each of the multiple locations and the real-time requirements of the communication session. A determination is made as to whether a default server can meet both real-time processing and real-time routing requirements of the voice translation session, and translation processing services are allocated to the available translation resources based on comparing the participant profiles of a talking participant and a listening participant.

With these novel features, an embodiment of the invention may provide a protocol method and system in which a talking VOIP server can locate and identify available resources at optimum locations to simultaneously process the source and target language content such that the end participant(s) receives the processed data in real-time from the listening VOIP server, therein maintaining a communication tempo during an online communication session.

BRIEF DESCRIPTION OF THE DRAWINGS

The foregoing and other exemplary purposes, aspects and advantages will be better understood from the following detailed description of an exemplary embodiment of the invention with reference to the drawings, in which.

Figure 4:
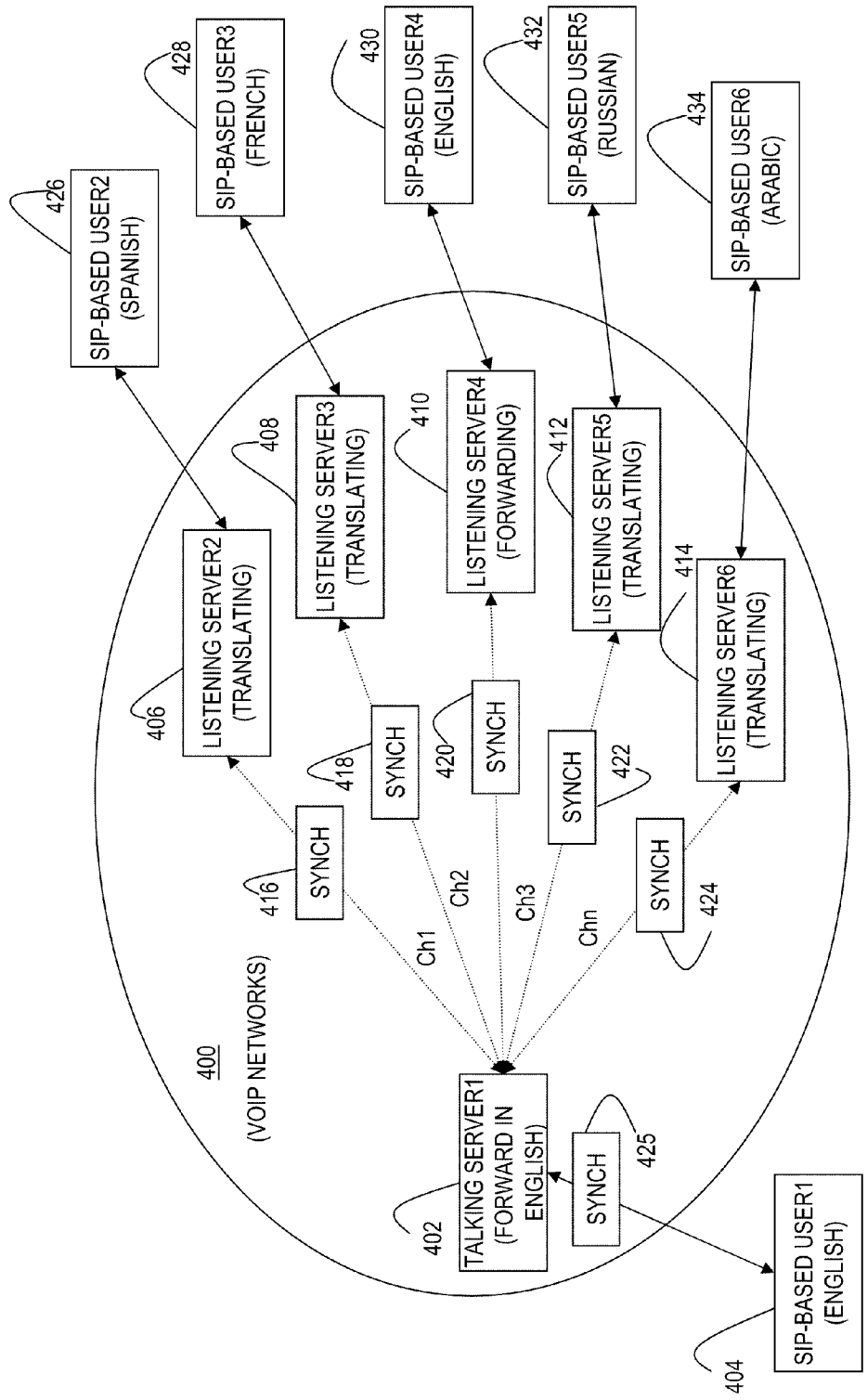
Figure 5:
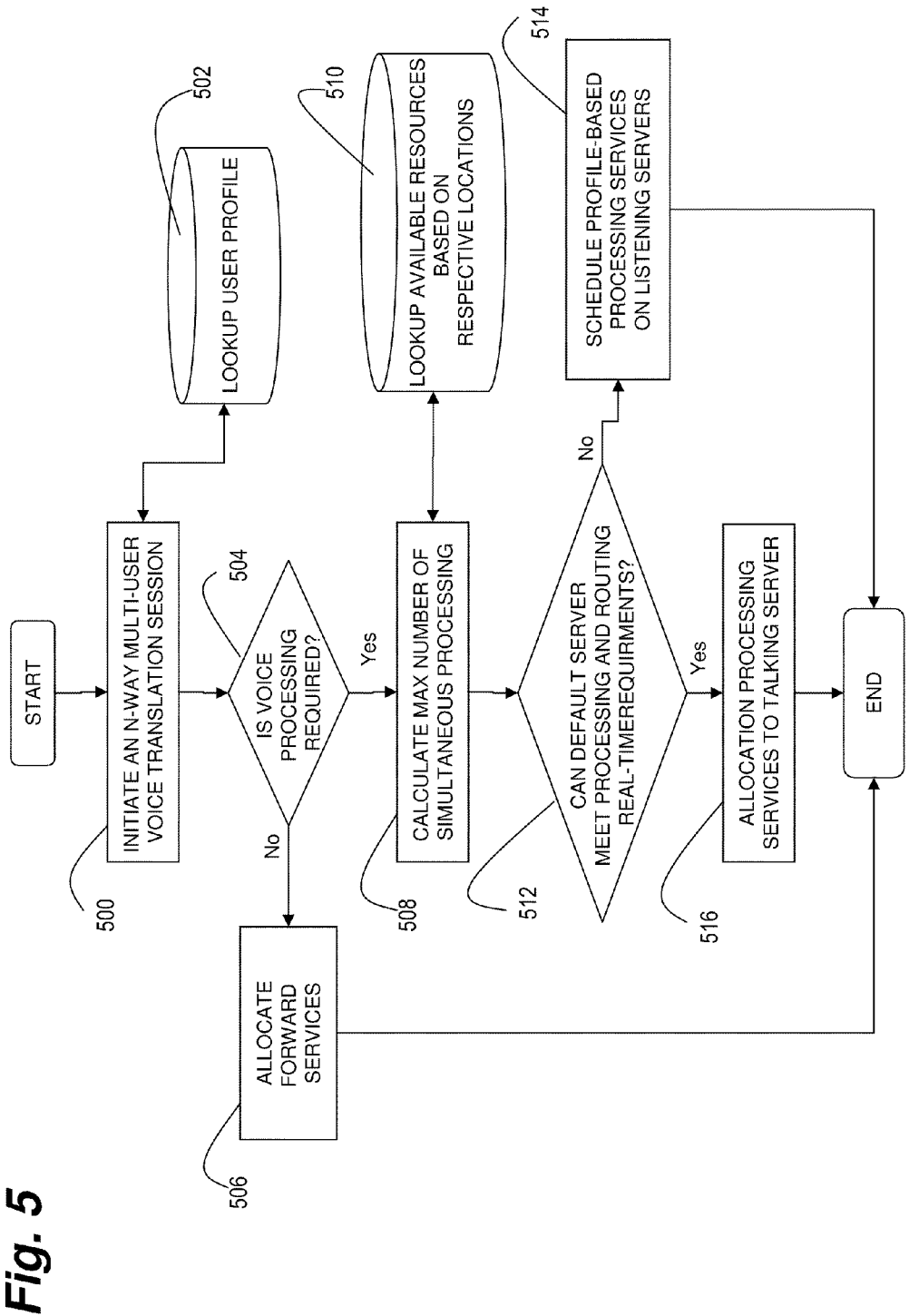
Figure 6:
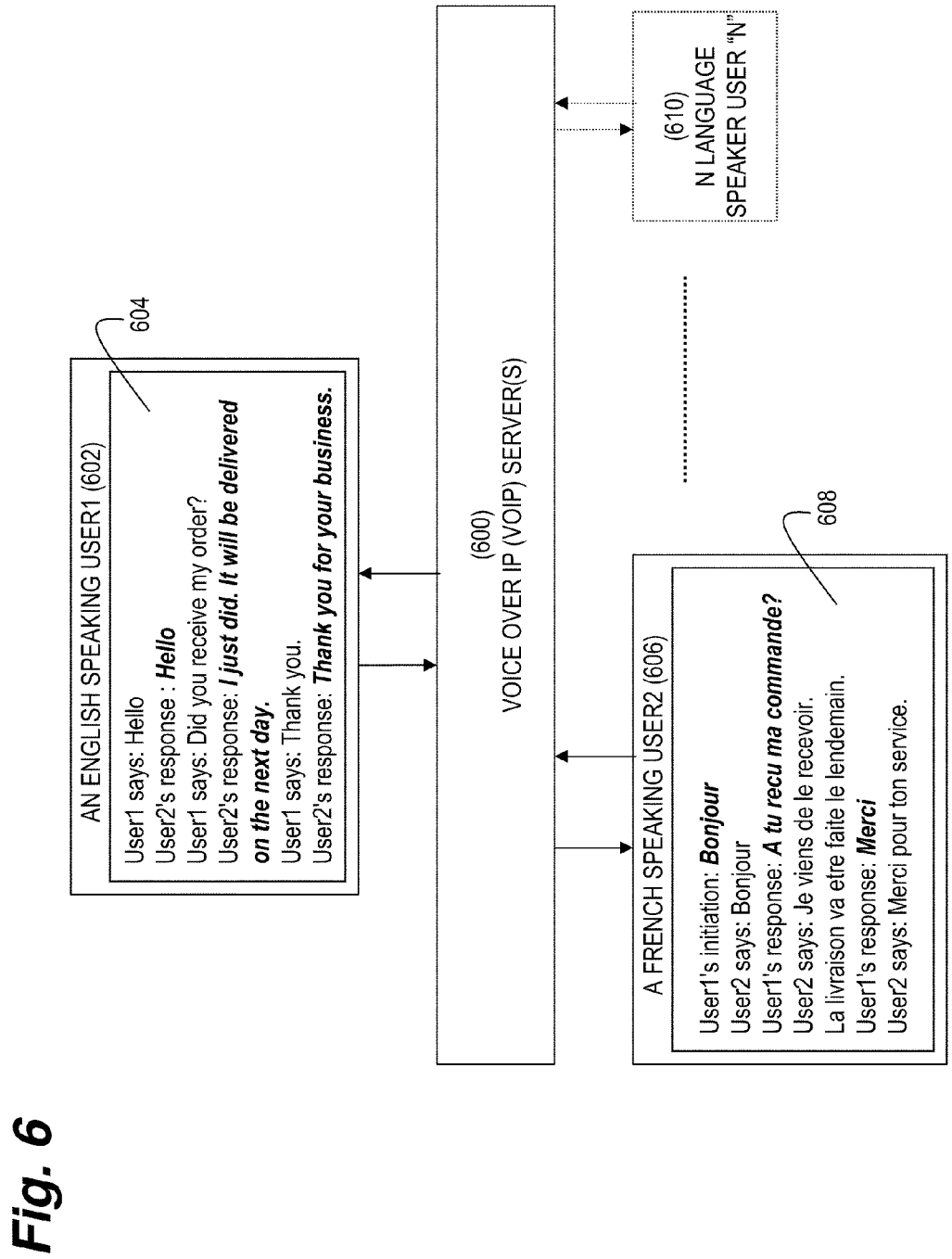
Figure 7:
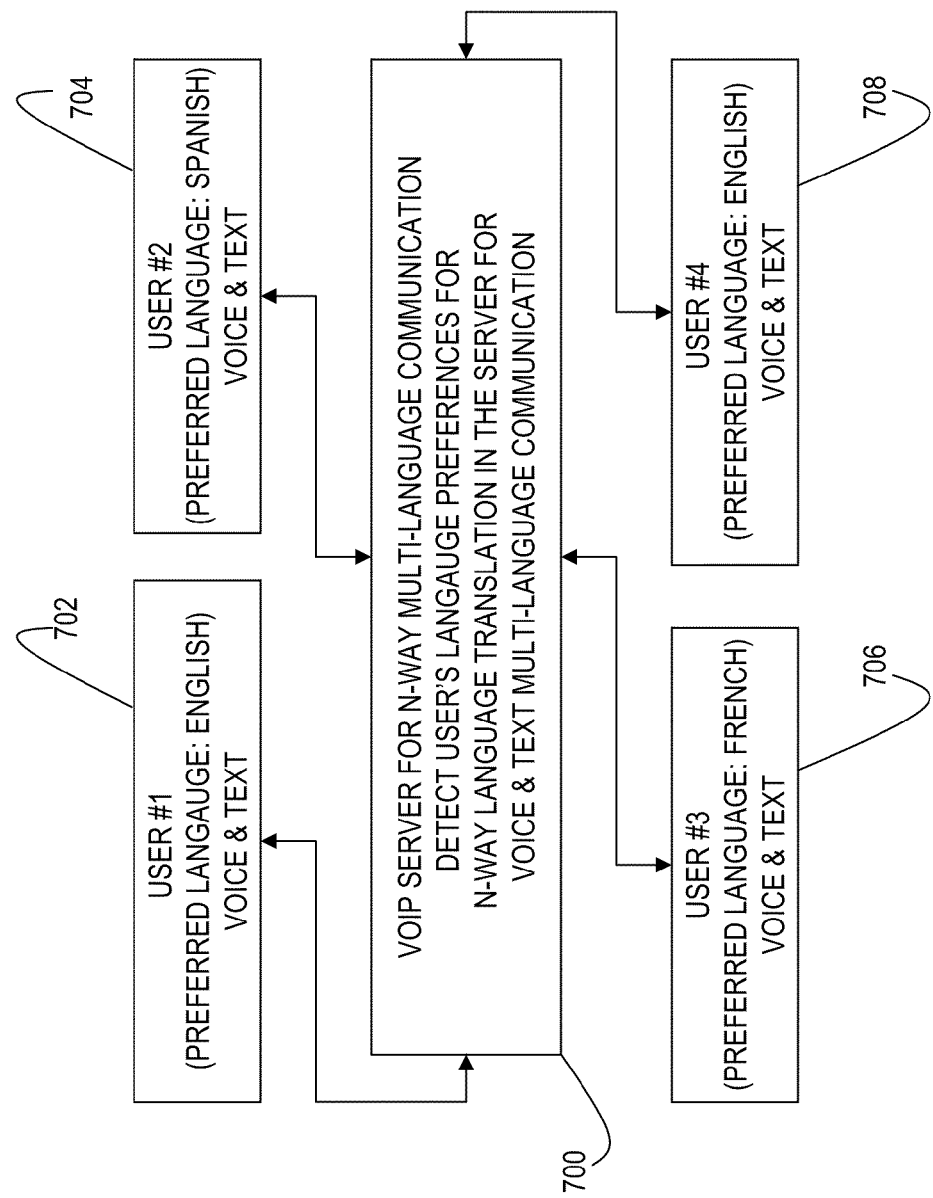
Figure 8:
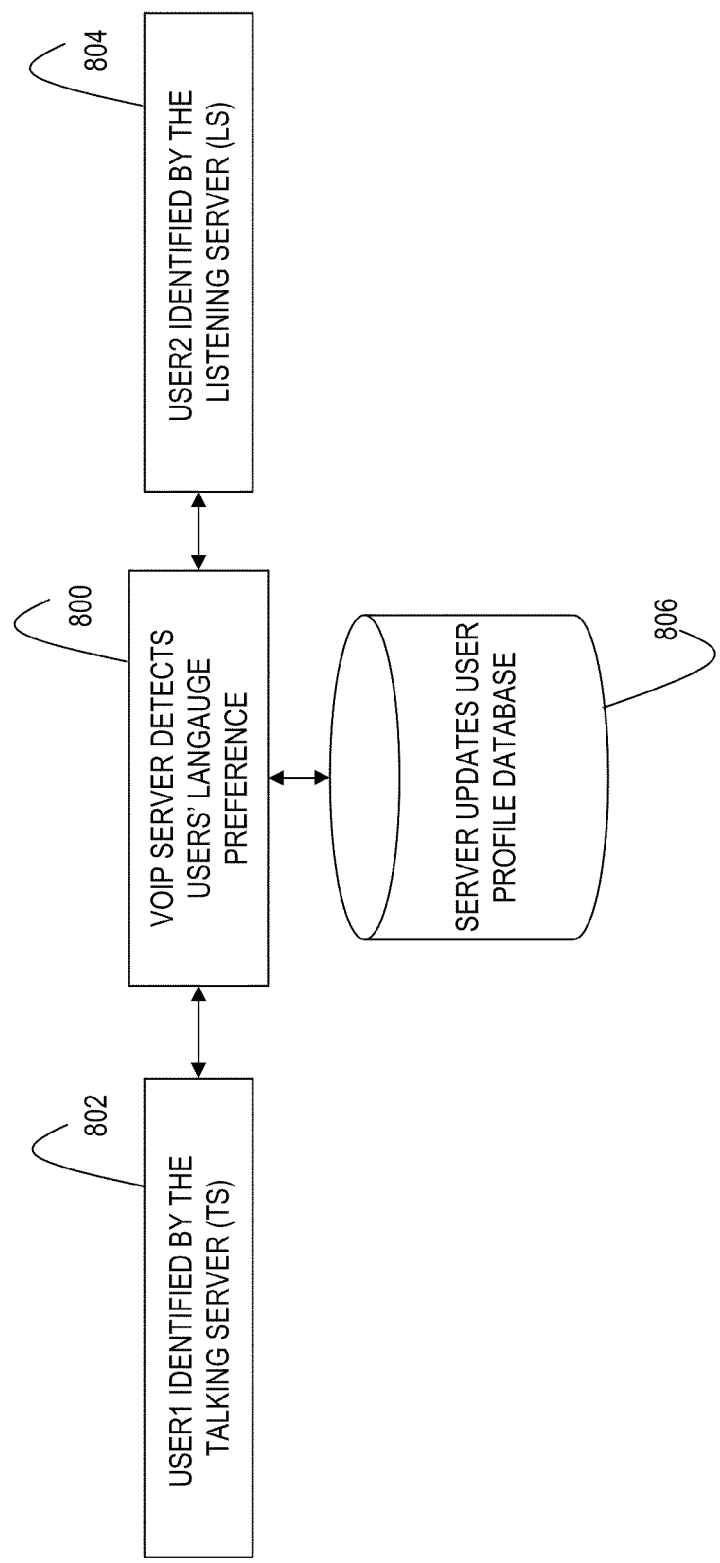
Figure 9:
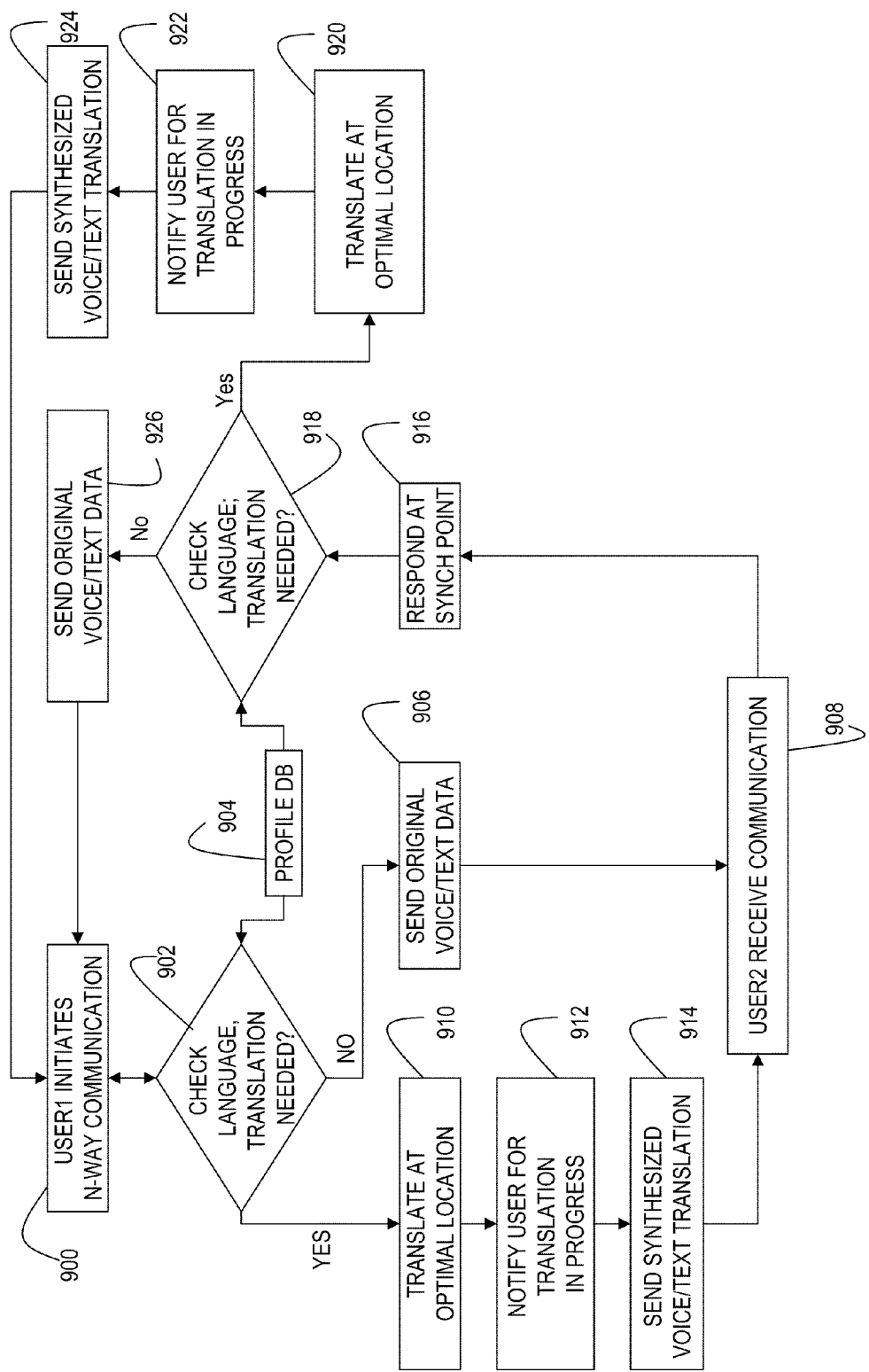
Figure 10:
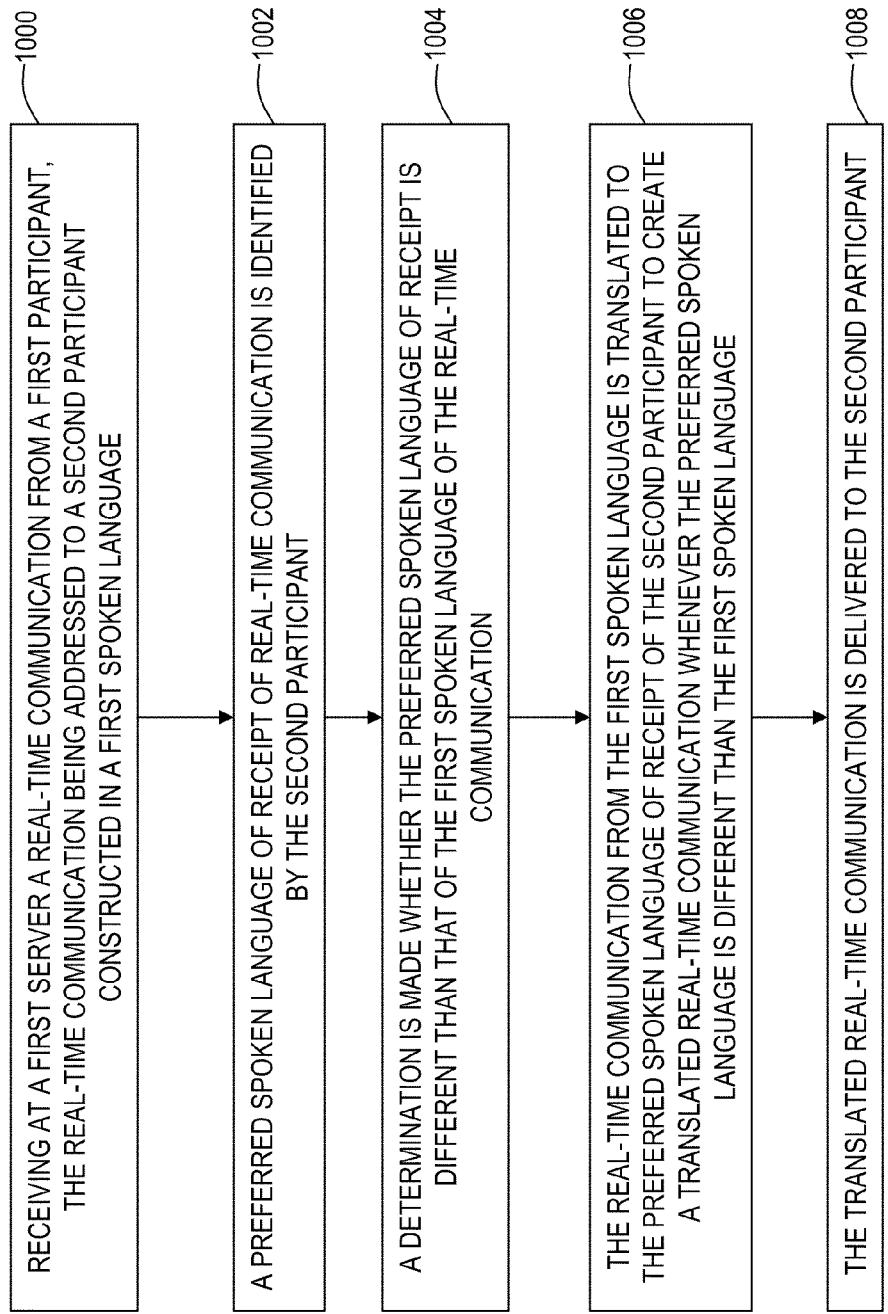
Figure 11:
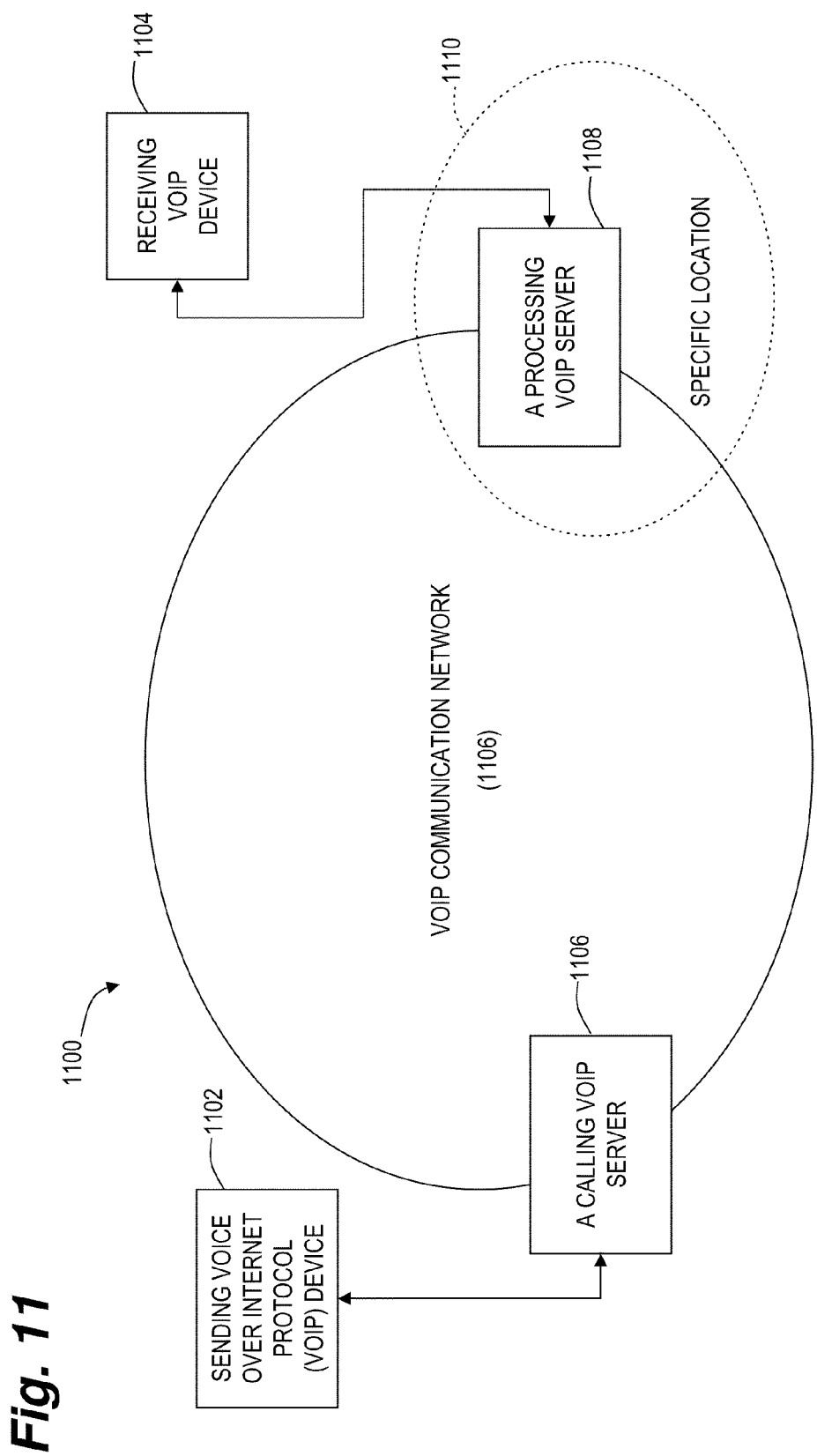
Figure 12:
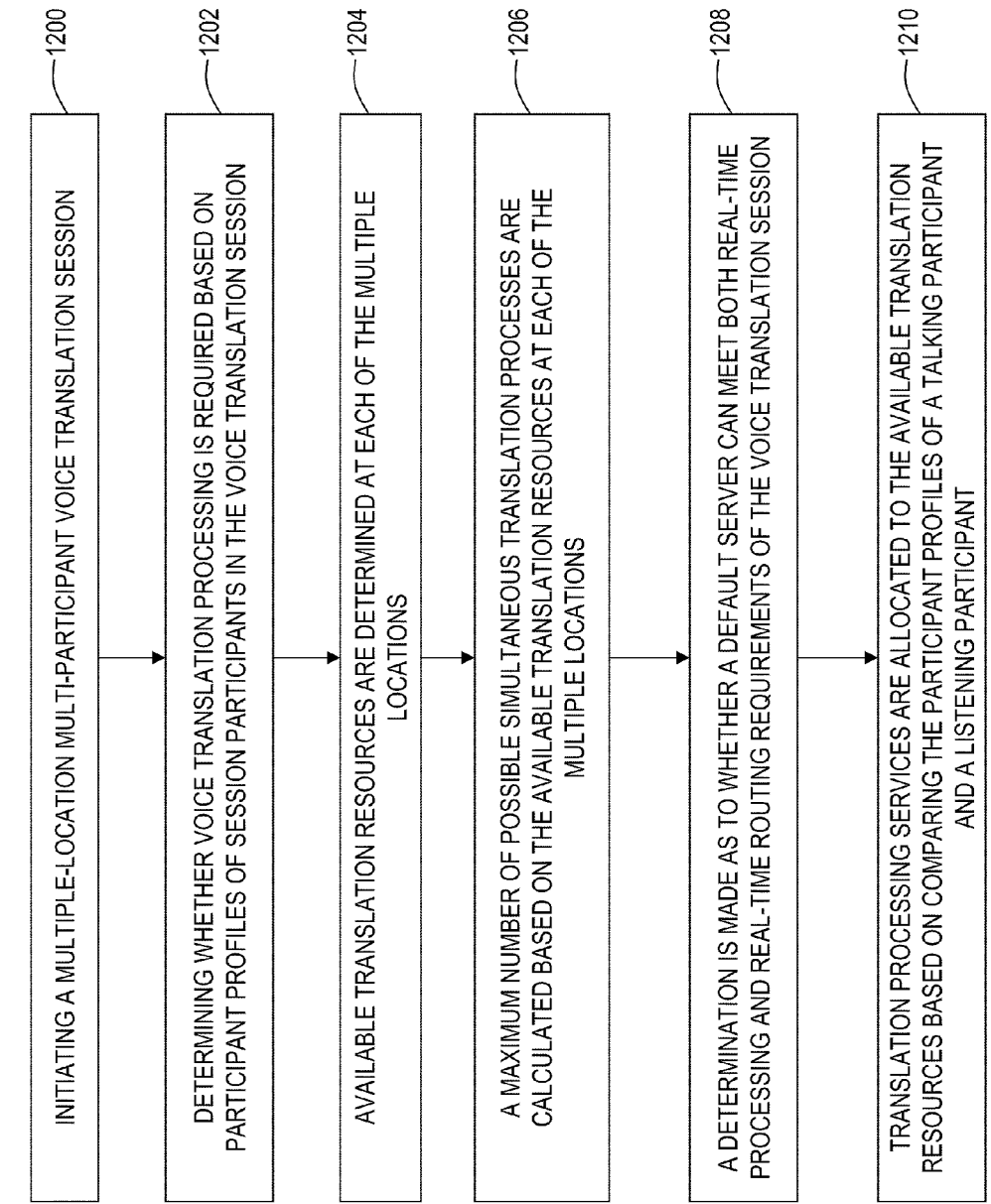
Figure 13:
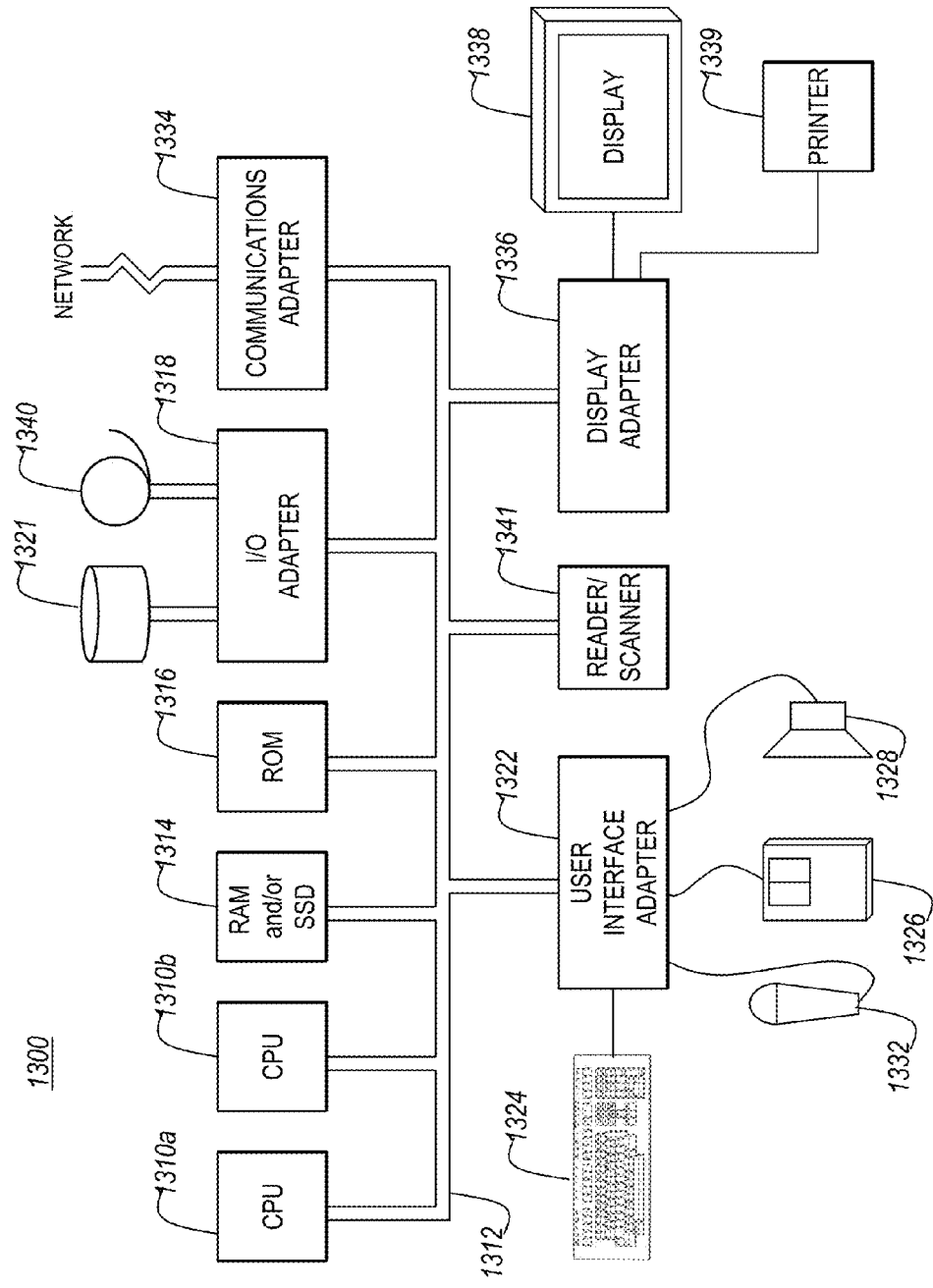
Figure 14:
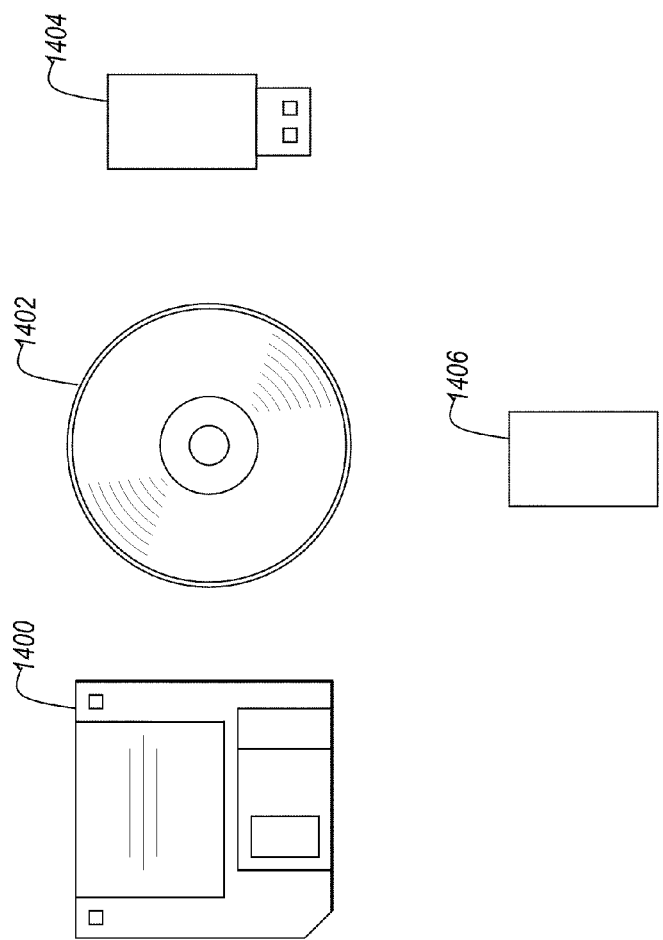

illustrates supported SIP methods of an embodiment of the invention;

FIG. 4 illustrates a SIP-Based VOIP of an embodiment of the invention;

FIG. 5 illustrates a SIP-Based VOIP of an embodiment of the invention including a server allocation procedure for processing at an optimum location;

FIG. 6 illustrates a SIP-Based VOIP of an embodiment of the invention including a VOIP session example;

FIG. 7 illustrates a SIP-Based VOIP of an embodiment of the invention including multi-party voice processing on a VOIP network;

FIG. 8 illustrates a SIP-Based VOIP of an embodiment of the invention including an idle mode;

FIG. 9 illustrates a SIP-Based VOIP of an embodiment of the invention including communication with a selective protocol;

FIG. 10 illustrates SIP-Based VOIP of an embodiment of the invention including a logic flowchart for a method of one embodiment of the invention;

FIG. 11 illustrates SIP-Based VOIP of an embodiment of the invention including a system diagram of one embodiment of the invention;

FIG. 12 illustrates SIP-Based VOIP of an embodiment of the invention including a logic flowchart for a method of one embodiment of the invention;

FIG. 13 illustrates a typical hardware configuration system which may be used for implementing the computer system and method according to the exemplary aspects of an embodiment of the invention; and FIG. 14 illustrates programmable storage media which may be used for implementing the computer system and method according to the exemplary aspects of an embodiment of the invention.

DETAILED DESCRIPTION OF EXEMPLARY EMBODIMENTS OF THE INVENTION

Referring now to the drawings, and more particularly to FIGS. 1-14, there are shown exemplary embodiments of the method and structures of an embodiment of the invention.

Overview

U.S. Pat. No. 6,434,526, incorporated herein by reference, describes a network application software services containing a speech recognition capability. Speech recognition software is provided in combination with application specific software on a communications network. Analog voice data is digitized at a user's location, identified as voice data, and transmitted to the application software residing at a central location. The network server receiving data identified as voice data transmits it to a speech server. Speech recognition software resident at the speech server contains a dictionary and modules tailored to the voice of each of the users of the speech recognition software. As the user speaks, a translation of the dictation is transmitted back to the user's location and appears in print on the user's computer screen for examination and if necessary, voice or typed correction of its contents. Multiple users have interleaved access to the speech recognition software so that transmission back to each of the users is contemporaneous.

U.S. Pat. No. 7,058,046, incorporated herein by reference, describes a scalable call management system. The system can include at least one voice server hosting one or more voice browsers, the voice server having a single communications port through which voice call requests can be processed by the voice browsers, each voice browser having a port alias through which call requests can be processed. The system also can include a call processing gateway linking telephony endpoints in a public switched telephone network (PSTN) to the voice server. Finally, the system can include a translation table mapping port aliases to respective voice browsers.

U.S. Pat. No. 7,406,414, incorporated herein by reference, describes a method of providing a translation within a voice stream can include receiving a speech signal in a first language, determining text from the speech signal, translating the text to a second and different language, and encoding the translated text within the speech signal.

As the companies integrate global resources into their work forces, the language barrier becomes a more important obstacle. This invention relates to electronic translation devices and methods for translating phrases from one language to another using a VOIP channel with n-Way selective voice protocol.

Normally, VOIP real-time requirements can exceed a given server application design capabilities when more than a single language translation is required. The challenge is determining which server can meet the real-time processing and routing requirements for an arbitrary number of concurrent profile-based VOIP processing to which the current invention is directed.

An embodiment of the invention provides a system and method in which, a talking VOIP server can locate and identify available resources at optimum locations to simultaneously process the source and target language content such that at least one end participant receives, in real-time the processed data from the listening VOIP server, maintaining a communication tempo during an on-line communication session based on a selective broadcast protocol.

Exemplary Aspects

Figure 1:
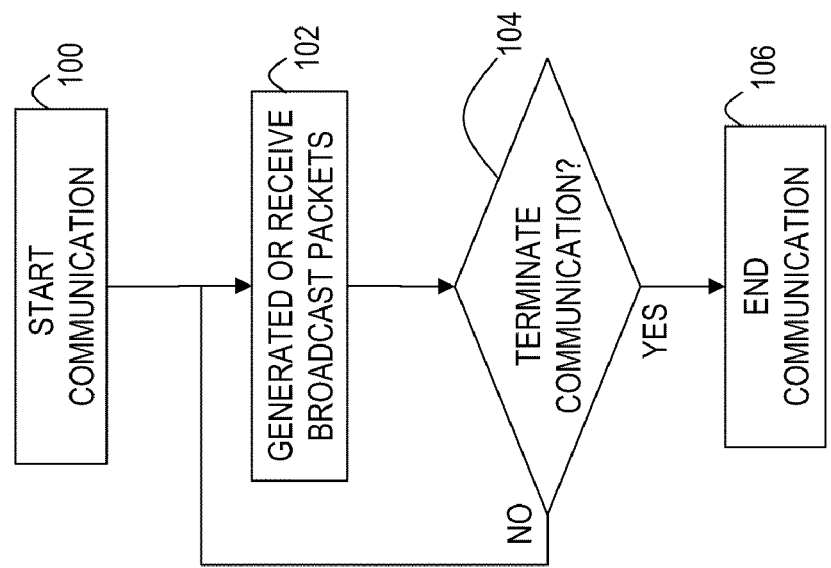
FIG. 1 illustrates a Session Initiation Protocol (SIP)-based Voice Over Internet Protocol (VOIP)

Referring again to the drawings, FIG. 1 illustrates a Session Initiation Protocol (SIP)-based Voice Over Internet Protocol (VOIP). The SIP application layer defines how one or more participant's end device can create, modify and terminate a connection whether the content is voice, video, data or web-based. However, SIP limitations are that in a teleconference session, all SIP packets are broadcast to all of the participants, therefore limiting scalability of computation and Peer to Peer (P2P) bandwidth for concurrent participants. FIG. 1 demonstrates the start of communication 100, where after, broadcast packets are either generated or received 102. If communication is not determined 104 to be terminated, broadcast packets are continued to be generated and received, else, communication is terminated 106.

Figure 2:
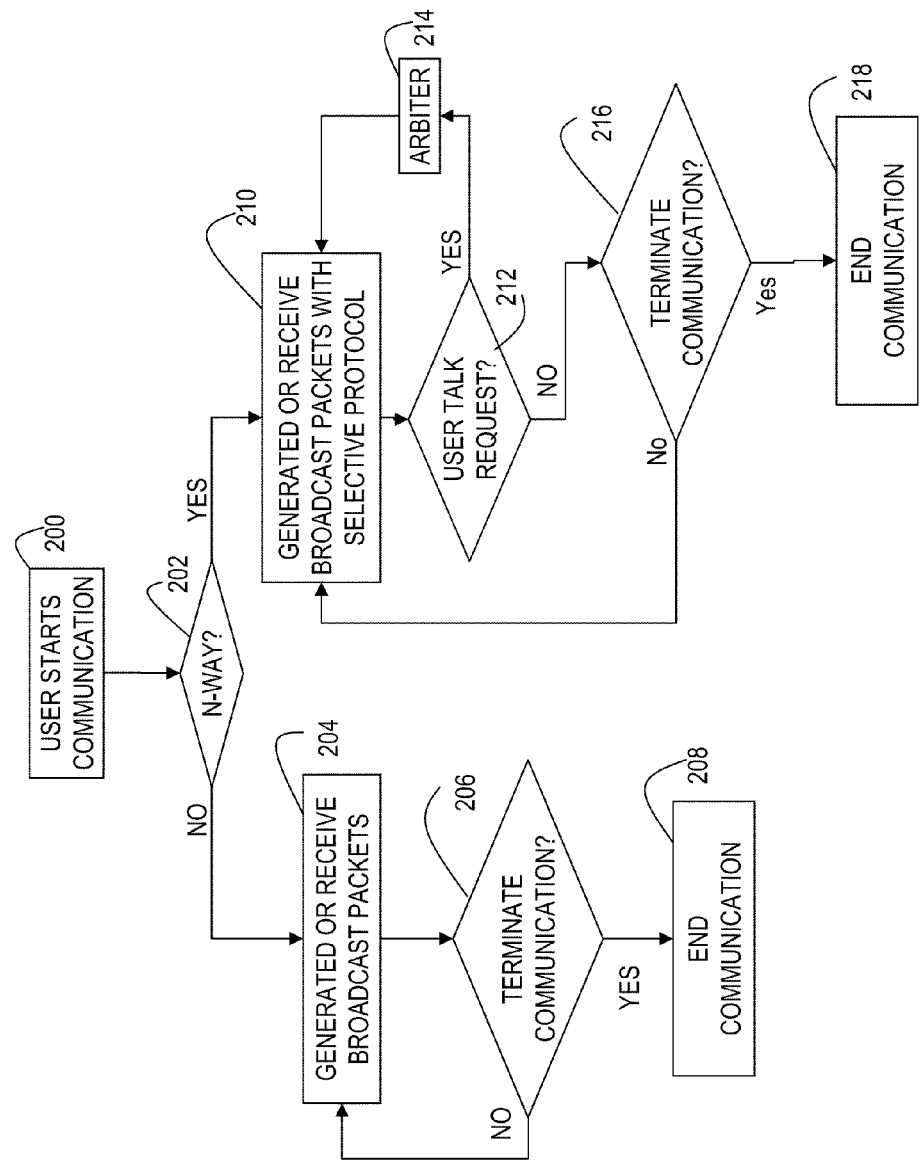
FIG. 2 illustrates a SIP-Based VOIP of an embodiment of the invention.

FIG. 2 illustrates a novel SIP-Based VOIP of an embodiment of the invention, wherein in a teleconference session, enhanced SIP packets follow a selective broadcast communication channel based on participant language profiles and available computing and communication resources to maintain coherency between participants. The start of communication is initiated at 200, where after a determination is made as to whether the communication is an n-way communication 202. An n-way communication is where there are more than two parties to a single communication session involving at least two languages. If it is determined that there is no n-way user/participant communication, for example, only a bi-directional communication, then broadcast packets are generated or received 204, and are continued to be generated or received until it is determined to terminate the communication 206 and end the communication altogether 208. Note, elements 204, 206 and 208 are identical to FIG. 1 elements 104, 106 and 108.

If it is determined that an n-way communication has been initiated by a user/participant 202, broadcast packets are generated or received 210. During communication if it is determined that a user/participant talk request is received 212, an arbiter service 214 may interrupt the broadcast packets at a synchronization or "synch" point. The communication session continues as long as there is no determination to terminate the communication session 216. After it is determined that a communication session is to be terminated 216, the communication session is ended 218.

Figure 3A:
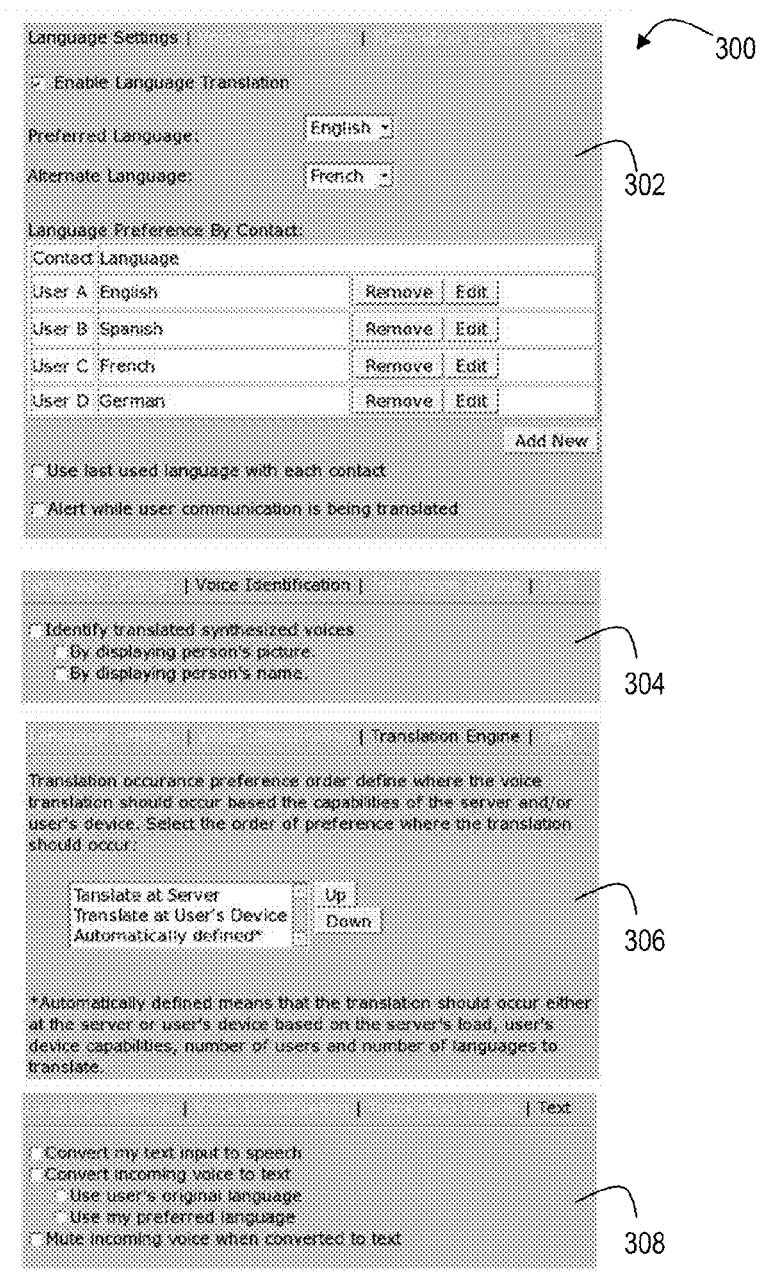
FIG. 3A illustrates series of four (4) profile configuration display pages.

FIG. 3A illustrates series of four (4) profile configuration display pages 300 where a user/participant may initially choose user/participant profile settings before a communication session begins. A "Language Settings," page 302 illustrates where a user/participant may enable language translation, choose a preferred and alternative translation language, choose a language preference specific to particular user/participant based on a user/participant contact profile, and select whether to use last language with each user/participant contact and alert the user/participant by communication is being translated. A "Voice Identification" page 304 illustrates where a user/participant may select to identify translated synthesized voices by displaying a user/participant's picture or name or identification. A "Translation Engine" page 306 illustrates where a user/participant may select where a server translation may occur. For example, translate at the user/participant server, translate that the user/participant's device, or translation may be automatically determined based on the servers load, the user/participant's device capabilities, and/or the number of users/participants and number of languages to translate. A "Text" page 308 illustrates where a user/participant may choose to convert translated text input into speech, incoming translated voice to text, using either the user/participant's original or preferred language, and mute the incoming translated voice when converted to text.

Figure 3B:
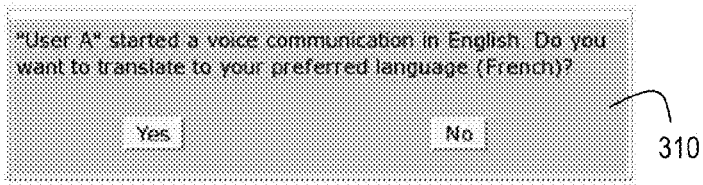
FIG. 3B illustrates a user/participant/participant prompt window displayed for a translation question.

FIG. 3B illustrates a user/participant prompt window 310 displayed for a translation question when a communication session is initiated. For example, a user/participant is identified as starting a voice communication in a particular language. The user/participant prompt window 310 requests the user/participant to enable translation of the communication into the user/participant's preferred language that was selected in the "Language Settings" 302 of FIG. 3A.

FIG. 4 illustrates a SIP-Based VOIP of an embodiment of the invention where a VOIP Network 400 is represented by a circle including a plurality of servers 402, 406, 408, 410, 412 and 414. The talking server1 402 is used to initiate an n-way communication session by a SIP-based user/participant) 404 whose native language, for example, is English. The talking server1 402 forwards to a plurality of listening servers2-6, 406-414, over the plurality of channels, Ch1, Ch2, Ch3 . . . Chn. Each listening server receives the English language broadcast audio packets in addition to user/participant profile information of the user/participant1 404, and user/participant profile information of the listening servers respective user/participant. For example, SIP-based user/participant2 is setup as a user/participant profile with a preferred translation language of Spanish. Listening server2 406 identifies the difference in languages between the two user/participant profiles of user/participant1 and user/participant2 and processes the English language broadcast audio packets of the listening server2 406 to be translated into a synthesized speech voice and a Spanish language for user/participant2 426. Likewise, user/participant3 428 receives French language based translation from listening server3 408, and similarly user/participant 5 432 receives Russian language based translation from listening server5 412, and user/participant6 receives Arabic language based translation from listening server6 434.

However, SIP-based user/participant4 430 as user/participant profile information set such that English is the preferred translation language. Since the English language broadcast audio packets transmitted from talking server1 402 need not be translated, listening server4 410 does not need to translate the communication transmission, but merely forward the English language broadcast audio packets directly to user/participant4 430.

Synch point 416, 418, 420, 422 and 424 are located in the VOIP networks 400 along communication channels Ch1 . . . Chn, respectively. These synch points allow the user/participant other than a talking user/participant to initiate a dialogue into the communication session at points where translation for a specific user/participant is complete in order to ensure coherency. For example, voice service requests are generated for communication resources based on user/participant defined profiles. These voice service requests may define a class of actions, i.e., a sequence of events that occur when one participant in the n-way communication session requests that a sync boundary action be taken. This may be a notification that the user/participant wants to initiate a dialog in an ongoing communication session. Specific control packet information associated with the voice service request is related to the following scenarios: 1) a talking server transmitting information to a listening server, and/or 2) a server transitioning from listening mode to talking mode. These service requests are honored at sync boundary points when translation/forwarding is idle between user/participants. The service requests are processed between sync points for new communication to commence at the sync points. User profiles can be configured to issue service requests to the synch boundary 425 upon partial percentage completion of translation. In one extreme, the service request could be initiated upon detection of first verbal response in the native language, to enable the listener to become the next speaker, prior to translation having occurred. In this manner, the first SIP-based user to speak would become the next talking server, with all other participants becoming listeners with a delay until hearing the translation. On the other extreme, the user configuration could cause service requests only upon completion of translation. Alternately, in a compromise mode, the user configuration could cause service requests upon successful translation of n-first words in the verbal communication. In such a manner, the user configurations can be optimized for the conversation.

FIG. 5 illustrates a SIP-Based VOIP of an embodiment of the invention including a server allocation procedure for processing at an optimum location where an n-way multi-user/participant voice translation session is initiated 500 and user/participant profile is retrieved 502. If a determination is made that voice processing/translation is not required 504, a server allocates forwarding services 506 similar to listening server4 410 in FIG. 4. If the determination is made that voice processing/translation is required 504, the server calculates the maximum number of simultaneous processing/translations needed for a particular language 508. The server may then look up available resources based on locations of respective translation servers 510. The determination is made as to whether a default/talking server can meet processing and routing real-time requirements 512, and if so, allocate processing/translation services to a default/talking server five and 16. If the default forwarding/talking server cannot meet the processing and routing real-time requirements, then a profile-based processing and routing is scheduled on a listening server(s) able to satisfy the processing and routing real-time requirements.

Additionally, original voice data file/packets may be transmitted to a translation server at a different location more proximate to a number of like-language user/participants who are closer in geographic proximity to the server. Thus, a location of voice file may be transmitted to another server without actual transmission of a packets based on participant-defined profiles.

The server that identifies an optimum server for translation processing may identify a server based on Global Positioning System (GPS) location information of respective participants in an active n-way communication session based on the participant-defined profiles. Thus, the servers determine the location of forwarding/translation participants, and allocate translation servers by using servers closer to particular user/participants to minimize communication traffic congestion and transmission delays.

FIG. 6 illustrates a SIP-Based VOIP of an embodiment of the invention including a VOIP bi-way session example. Voice over IP servers 600 receive communication from an English speaking user/participant1 602 and the French speaking user/participant2 606. English speaking user/participant1 dialog 604 reflects the initiation of dialog of user/participant1 and the translated response from French into English from user/participant2. French speaking user/participant2 dialog 608 reflects the response to the dialog of user/participant1 and a translated response from English into French from user/participant1. An "N Language" speaker user/participant "N" would receive the translation of the complete dialog of user/participant 1 and user/participant2 in the "N Language" of user/participant "N".

FIG. 7 illustrates a SIP-Based VOIP of an embodiment of the invention including an n-way multi-party voice processing on a VOIP network. VOIP server 700 for n-way multi language communication detects a user/participant's language preferences for n-way language translation in the server for voice and/or text multi-language communication. In addition to voice and text data subject to translation and/or forwarding, supplemental audio, documents with text and video data with audio may be integrating into the n-way communication and be subject to the same translating and/or forwarding functions based on user/participant defined profile data.

VOIP server may include a plurality of servers that may be distributed over different geographic locations. User/participant #1, user/participant #2, user/participant #3 and user/participant #4, for example, have preferred languages of English, Spanish, French and English, respectively. Voice and text data may be either translated into a preferred language of a listening user/participant, or forwarded directly to a user/participant when of translation is needed, for example, communication between user/participant #1 and user/participant #4 whose preferred language is both the same, i.e., English.

FIG. 8 illustrates a SIP-Based VOIP of an embodiment of the invention including an idle mode where a VOIP server 800 detects user/participants' language preferences and updates a user/participant profile database 806 with user/participant profile data. The participant profile database 806 is used to extend the SIP protocol to base communication on the comparison and determination of either similarities or dissimilarities between user/participant profile data. User/participant1 802 is identified by the talking server (TS) and user/participant2 804 is identified by the listening server.

FIG. 9 illustrates a SIP-Based VOIP of an embodiment of the invention including communication with a selective protocol. User/participant1 initiates 900 an n-way communication with a number of user/participants in at least two languages. A check 902 of the language preferences 904 of user/participant1 and the intended recipient, user/participant2, is made to determine if a translation of a language is made. If no translation is needed, and the communication is merely forwarded to a similar language speaking recipient, then the original voice data is sent directly to the user/participant 906, and is received by the user/participant2 in the n-way communication 908.

If a translation is determined 902 to be needed based on the difference in user/participant profile data from the user/participant profile database 904, then a determination is made to translate the voice or text data at an optimal location based on server loads, communication routing and geographic proximity to other user/participants having identical language profiles 910. A notification 912 is made to the user/participant2 who will receive a sent synthesized voice translation or a text translation 914.

User/participant2 receives the translated voice/text data or the original non-translated voice/text data 908, and may respond to user/participant1, or another user/participant in the communication session, (not shown). User/participant2 responds at a synch point 916 where a translation server enters an idle state after translating data from the previously communication user/participant, for example, user/participant1 at 900. The listening/forwarding server for user/participant2 now becomes a talking server and checks if language translation is needed 918 based on a user/participant profile database 904. If no translation is needed, the original voice/text data is sent to user/participant1 926 or another other user/participant as directed by user/participant2.

If a translation is determined 918 to be needed based on the difference in user/participant profile data from the user/participant profile database 904, then a determination is made to translate the voice or text data at an optimal location based on server loads, communication routing and geographic proximity to other user/participants having identical language profiles 920. A notification 922 is made to the user/participant1 who will receive a sent synthesized voice translation or a text translation 924.

FIG. 10 illustrates an exemplary computer-implemented embodiment enables real-time communication between multiple participants, wherein the method includes receiving at a first server a real-time communication from a first participant, the real-time communication being addressed to a second participant constructed in a first spoken language 1000. A preferred spoken language of receipt of real-time communication is identified by the second participant 1002. A determination is made whether the preferred spoken language of receipt is different than that of the first spoken language of the real-time communication 1004. The real-time communication from the first spoken language is translated to the preferred spoken language of receipt of the second participant to create a translated real-time communication whenever the preferred spoken language is different than the first spoken language 1006. The translated real-time communication is delivered to the second participant 1008.

Voice service requests are generating for communication resources and the voice communication is processed on-demand between first and second participant based on participant-defined profiles.

Translated text, supplemental translated audio, translated document text and video data having translated audio may also be integrated into the participant communication based on participant-defined profiles. The communicating a location of voice file may be accomplished without actual transmission of the document based on participant-defined profile. Additionally, translating may further include identifying Global Positioning System (GPS) location information of respective participants in the active communication channel based on participant-defined profiles. Processing of the real-time communication may further include determining an optimal location at which to process the real-time communication based on the participant-defined profiles.

FIG. 11 illustrates another exemplary embodiment includes a communication system 1100 including at least one sending Voice Over Internet protocol (VOIP) server 1102, at least one receiving VOIP server 1104, and at least one VOIP communication network 1106 providing communication between the sending VOIP server 1102 and the receiving VOIP server 1104. A translating module 1106 establishes an active n-way bidirectional automatic voice translation channel between the sending 1102 and the receiving 1104 VOIP servers across the at least one VOIP communication network 1106. A processing VOIP server 1108 at a specific location 1110 translates at least one spoken language between participants of different spoken languages on the at least one VOIP communication network 1106. Processing the at least one spoken language is determined to be carried out at the specific location 1110 of the processing VOIP server 1108 based on respective participant profiles of the participants of difference spoken languages. Processing server 1108 may include the sending VOIP server 1102 or the receiving VOIP server 1104 if it is determined that either of those servers (1102/1104) is in the specific location 1108 to handle processing of the translation.

Each participant profile, stored in a participant profile database, includes a participant spoken language profile. A voice service request module generates a request for available communication resources based on the participant profiles. A media integrator that integrates information containing text, voice, document and video data based on the participant profiles with the at least one spoken language being translated.

A plurality of listening VOIP servers may host participants having different participant spoken language profiles. The processing VOIP server includes a plurality of VOIP talking servers and a plurality of VOIP listening servers.

FIG. 12 illustrates another exemplary embodiment includes a computer-implemented method that includes initiating a multiple-location multi-participant voice translation session 1200, then determining whether voice translation processing is required based on participant profiles of session participants in the voice translation session 1202. Available translation resources are determined 1204 at each of the multiple locations and a maximum number of possible simultaneous translation processes are calculated 1206 based on the available translation resources at each of the multiple locations. A determination is made as to whether a default server can meet both real-time processing and real-time routing requirements of the voice translation session 1208, and translation processing services are allocated to the available translation resources based on comparing the participant profiles of a talking participant and a listening participant 1210.

Allocating forwarding services are based on determining whether voice translation processing is required based on participant profiles. Scheduling participant profile-based translation processing services on at least one listening server based on the determining based on comparing the participant profiles of the talking participant and the listening participant.

With its unique and novel features, an embodiment of the invention provides a protocol method and system in which a talking VOIP server can locate and identify available resources at optimum locations to simultaneously process the source and target language content such that the end participant(s) receives the processed data in real-time from the listening VOIP server, therein maintaining a communication tempo during an online communication session As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a solid-state device (SSD), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 13 illustrates a typical hardware configuration system which may be used for implementing the computer system and method according to the exemplary aspects of an embodiment of the invention; and Referring now to FIG. 13, system 1300 illustrates a typical hardware configuration which may be used for implementing the inventive system and method for [GENERAL STATEMENT OF METHOD/SYSTEM]. The configuration has preferably at least one processor or central processing unit (CPU) 1310*a*, 1310*b*. The CPUs 1310*a*, 1310*b* are interconnected via a system bus 1312 to a random access memory (RAM) and/or solid-state device (SSD) 1314, read-only memory (ROM) 1316, input/output (I/O) adapter 1318 (for connecting peripheral devices such as disk units 1321 and tape drives 1340 to the bus 1312), participant interface adapter 1322 (for connecting a keyboard 1324, mouse 1326, speaker 1328, microphone 1332, and/or other participant interface device to the bus 1312), a communication adapter 1334 for connecting an information handling system to a data processing network, the Internet, and Intranet, a personal area network (PAN), etc., and a display adapter 1336 for connecting the bus 1312 to a display device 1338 and/or printer 1339. Further, an automated reader/scanner 1341 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of an embodiment of the invention is directed to a programmed product, including signal-bearing media tangibly embodying a program of machine-readable instructions executable by a digital data processor to perform the above method.

Such a method may be implemented, for example, by operating the CPU 1310 to execute a sequence of machine-readable instructions. These instructions may reside in various types of signal bearing media.

Thus, this aspect of an embodiment of the invention is directed to a programmed product, comprising signal-bearing media tangibly embodying a program of machine-readable instructions executable by a digital data processor incorporating the CPU 1310 and hardware above, to perform the method of the invention.

This signal-bearing media may include, for example, a RAM and/or SSD contained within the CPU 1310, as represented by the fast-access storage for example. Alternatively, the instructions may be contained in another signal-bearing media, such as a magnetic data storage diskette 1400, CD-ROM 1402 or "plug-and-play" memory device 1404, like a USB flash drive, (FIG. 14), directly or indirectly accessible by the CPU 1410.

Whether contained in the computer server/CPU 1310, or elsewhere, the instructions may be stored on a variety of machine-readable data storage media, such as DASD storage (e.g., a conventional "hard drive" or a RAID array), magnetic tape, electronic read-only memory (e.g., ROM, SSD, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A computer-implemented method of enabling real-time communication between multiple participants in a Session Initiation Protocol based on Voice Over Internet Protocol (VOIP), the method comprising:
    receiving, at a sending VOIP server, a real-time communication from a first participant in a first spoken language that initiates a dialog with a second participant, said real-time communication being broadcast to said second participant in said first spoken language;
    identifying, by a receiving VOIP server, a second spoken language to be received by said second participant for said real-time communication of said dialog;
    determining, by said receiving VOIP server, that said second spoken language is different than that of said first spoken language for said real-time communication of said dialog;
    translating, by said receiving VOIP server, said real-time communication of said dialog from said first spoken language to said second spoken language for said second participant to create a translated real-time communication of said dialog; and
    delivering, by said receiving VOIP server, said translated real-time communication of said dialog to said second participant in said second spoken language.

2. The method according to claim 1, further comprising:
    generating voice service requests for communication resources at a synchronization point located between said sending VOIP server and said receiving VOIP server, based on a first participant's language profile and a second participant's language profile.

3. The method according to claim 1, further comprising:
    synchronizing, by said sending VOIP server and said receiving VOIP server, on-demand, said real-time communication of said dialog between first participant and said second participant.

4. The method according to claim 1, further comprising:
    integrating translated text, supplemental translated audio, translated document text and video data having translated audio in said real-time communication of said dialog, based on said first participant's language profile and said second participant's language profile.

5. The method according to claim 4, further comprising:
    communicating, by said sending VOIP server, a location of voice data without actual transmission of said voice data based on said first participant's language profile and said second participant's language profile.

6. The method according to claim 1, further comprising:
    identifying a receiving VOIP server based on Global Positioning System (GPS) location information of said first and second participants in said first participant's language profile and said second participant's language profile.

7. The method according to claim 1, said processing of said real-time communication of said dialog further comprising:
    determining an optimal location of said receiving VOIP server at which to process said real-time communication of said dialog based on said participant-defined profiles.

8. A communication system comprising:
    a memory that stores a first participant's language profile and a second participant's language profile;
    at least one sending Voice Over Internet Protocol (VOIP) server; and
    at least one receiving VOIP server that:
        receives a real-time communication from a first participant in a first spoken language that initiates a dialog with a second participant, said real-time communication being broadcast to said second participant in said first spoken language;
        identifies a second spoken language to be received by said second participant for said real-time communication of said dialog;
        determines that said second spoken language is different than that of said first spoken language for said real-time communication of said dialog;
        translates said real-time communication of said dialog from said first spoken language to said second spoken language for said second participant to create a translated real-time communication of said dialog; and
        delivers said translated real-time communication of said dialog to said second participant in said second spoken language.

9. The system according to claim 8, further comprising:
    a synchronization point located between said at least one sending VOIP server and said at least one receiving server that generates a voice service request by a voice service request module for available communication resources, based on said first participant's language profile and said second participant's language profile.

10. The system according to claim 8, said receiving VOIP server further integrating, by a media integrator, information containing text, voice, document and video data based on said first participant's language profile and said second participant's language profile.

* * * * *